(12) United States Patent
Hur (10) Patent No.: US 10,769,940 B2
(45) Date of Patent: Sep. 8, 2020

(54) METHOD FOR OPENING AND CLOSING DOOR OF VEHICLE FOR SAFE GETTING-OFF OF PASSENGER

(71) Applicant: LG Electronics Inc., Seoul (KR)

(72) Inventor: In Hur, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/554,985

(22) Filed: Aug. 29, 2019

(65) Prior Publication Data

US 2019/0385443 A1 Dec. 19, 2019

(30) Foreign Application Priority Data

Aug. 6, 2019 (KR) ........................ 10-2019-0095691

(51) Int. Cl.
*G08G 1/095* (2006.01)
*G08G 1/005* (2006.01)
*G05D 1/02* (2020.01)
*G01C 21/34* (2006.01)
*B60T 7/12* (2006.01)
*B60W 30/18* (2012.01)

(52) U.S. Cl.
CPC ............... *G08G 1/005* (2013.01); *B60T 7/12* (2013.01); *B60W 30/18109* (2013.01); *G01C 21/3438* (2013.01); *G05D 1/021* (2013.01); *B60T 2201/10* (2013.01); *B60W 2520/04* (2013.01)

(58) Field of Classification Search
CPC .......... G08G 1/005; G05D 1/021; G05D 1/02; G01C 21/34; G01C 21/3438
See application file for complete search history.

(56) References Cited

U.S. PATENT DOCUMENTS 10,482,691 B1 * 11/2019 McCluskey ........ G08B 21/0275
2017/0351725 A1 * 12/2017 Oelert ................. G06Q 20/045
2019/0265703 A1 * 8/2019 Hicok ................. G05B 13/027

* cited by examiner

*Primary Examiner* — Toan N Pham
(74) *Attorney, Agent, or Firm* — Fish & Richardson P.C.

(57) ABSTRACT

Disclosed is a method of opening or closing the door of a vehicle including a getting-off zone partitioned by an inside door and an outside door. The method includes identifying user information of a passenger within the inside door, opening the inside door based on a result of a comparison between a stop location of the vehicle and a destination location corresponding to the user information, determining whether a passenger within the getting-off zone is a getting-off target, and opening the outside door based on a result of the determination. The vehicle to which the present disclosure is applied may be associated with a given artificial intelligence (AI) module, a drone, an unmanned aerial vehicle, a robot, an augmented reality (AR) module, a virtual reality (VR) module, and a $5^{th}$ generation (5G) mobile communication apparatus, etc.

16 Claims, 10 Drawing Sheets

| Passenger | User information | Age | Getting-off grade | Destination location | Guardian terminal |
|---|---|---|---|---|---|
| 1 | A | 6 | Level 1 | Station 2 | T1 |
| 2 | B | 11 | Level 2 | Station 1 | — |

METHOD FOR OPENING AND CLOSING DOOR OF VEHICLE FOR SAFE GETTING-OFF OF PASSENGER

CROSS-REFERENCE TO RELATED APPLICATION

The present disclosure claims priority to and the benefit of Korean Patent Application No. 10-2019-0095691 filed on Aug. 6, 2019, the disclosure of which is incorporated herein by reference in its entirety.

BACKGROUND

1. Technical Field

The present disclosure relates to a method of opening or closing each door of a vehicle so that a passenger can safely get off the vehicle including a getting-off zone partitioned by an inside door and an outside door.

2. Related Art

Recently, research is carried out on an autonomous vehicle that autonomously travels to a destination without a driver's manipulation. The development of the autonomous vehicle has been in the spotlight as an alternative capable of preventing casualties in the driving of the vehicle. The autonomous vehicle will be gradually commercialized from the field in which a human's free will is less involved.

A shuttle bus is a vehicle that shuttles a given interval and stops only at a designated station. Accordingly, a human's free will is less involved in vehicle driving, and thus an attempt is made to introduce the autonomous driving technology into the shuttle bus.

In the case of a shuttle bus for children's commute, a safety accident frequently occurs while the bus is traveling or when a child gets in or off the bus. Specifically, there occur accidents, such as an accident occurring because a child does not get off the bus at a designated station and is left alone in the bus, a missing accident occurring because a child gets off the bus at a different station other than a designated station, and a collision accident attributable to a different vehicle when a child gets off the bus at a station.

Accordingly, although the autonomous driving technology in which a shuttle bus simply travels along a specific driving route and stops at a designated station is introduced, there is a problem in that it is difficult to prevent the above-described safety accidents.

For such a background, there is a need for a technology in which a vehicle that requires the getting-off of a passenger, such as a shuttle bus, can autonomously drive without a safety accident.

SUMMARY

Various embodiments are directed to the provision of a method of opening or closing the door of a vehicle, capable of allowing only a passenger who needs to get off a vehicle at a specific destination to selectively get off the vehicle.

Furthermore, various embodiments are directed to the provision of a method of opening or closing the door of a vehicle, capable of allowing a passenger to get off a vehicle only when a guardian is located at the destination of the passenger.

Furthermore, various embodiments are directed to the provision of a method of opening or closing the door of a vehicle, capable of allowing a passenger to get off a vehicle based on whether a dangerous object outside the vehicle is identified.

Furthermore, various embodiments are directed to the provision of a method of opening or closing the door of a vehicle, capable of allowing a passenger to get off a vehicle at an exceptionally designated destination other than a designated destination if a guardian's approval is present.

Furthermore, various embodiments are directed to the provision of a method of opening or closing the door of a vehicle, capable of allowing all passengers to get off a vehicle regardless of a stop location when a danger is detected within the vehicle.

The objects of the present disclosure are not limited to the above-described object, and not-described other objects and advantages of the present disclosure may be understood from the following description and evidently understood based on embodiments of the present disclosure. It may also be seen that the objects and advantages of the present disclosure may be realized by means written in the claims and a combination thereof.

In an embodiment, a method of opening or closing the door of a vehicle may include: including a getting-off zone partitioned by an inside door and an outside door includes identifying user information of a passenger within the inside door, opening the inside door based on a result of a comparison between a stop location of the vehicle and a destination location corresponding to the user information, determining whether a passenger within the getting-off zone is a getting-off target, and opening the outside door based on a result of the determination.

DETAILED DESCRIPTION

Exemplary embodiments will be described below in more detail with reference to the accompanying drawings. The disclosure may, however, be embodied in different forms and should not be construed as limited to the embodiments set forth herein. Rather, these embodiments are provided so that this disclosure will be thorough and complete, and will fully convey the scope of the disclosure to those skilled in the art. Throughout the disclosure, like reference numerals refer to like parts throughout the various figures and embodiments of the disclosure.

The above-described objects, characteristics, and merits are described in detail with reference to the accompanying drawings, and thus a person having ordinary skill in the art to which the present disclosure pertains may readily practice the technical spirit of the present disclosure. Furthermore, in describing the present disclosure, a detailed description of a known art related to the present disclosure will be omitted if it is deemed to make the gist of the present disclosure unnecessarily vague. Hereinafter, embodiments according to the present disclosure are described in detail with reference to the accompanying drawings. In the drawings, the same reference numerals are used to the same or similar elements.

In the following description, the meaning that a given element is positioned "over (or under)" an element or "on (or below)" an element means that a different element may be interposed between the element and a given element positioned "over (or under)" the element, in addition to that a given element is positioned on the top surface (or bottom surface) of the element.

Various embodiments of the present disclosure relate to a method of opening or closing each door of a vehicle so that a passenger can safely get off the vehicle including a getting-off zone partitioned by an inside door and an outside door.

In the present disclosure, a vehicle may be implemented as an internal combustion engine vehicle having an engine as a power source, a hybrid vehicle having an engine and electric motor as a power source, an electric vehicle having an electric motor as a power source, or a hydrogen fuel cell electric vehicle having a fuel cell as a power source.

Furthermore, the vehicle may be an autonomous vehicle which can autonomously drive to a destination without a user's manipulation. In this case, the autonomous vehicle may be associated with a given artificial intelligence (AI) module, a drone, an unmanned aerial vehicle, a robot, an augmented reality (AR) module, a virtual reality (VR) module, or a 5th generation (5G) mobile communication apparatus.

Hereinafter, a vehicle and methods of opening or closing the door of the vehicle according to embodiments of the present disclosure will be described specifically with reference to the accompanying drawings.

First, the structural characteristics of a vehicle according to an embodiment of the present disclosure will be described with reference to FIGS. 1, 2A and 2B.

Figure 1:
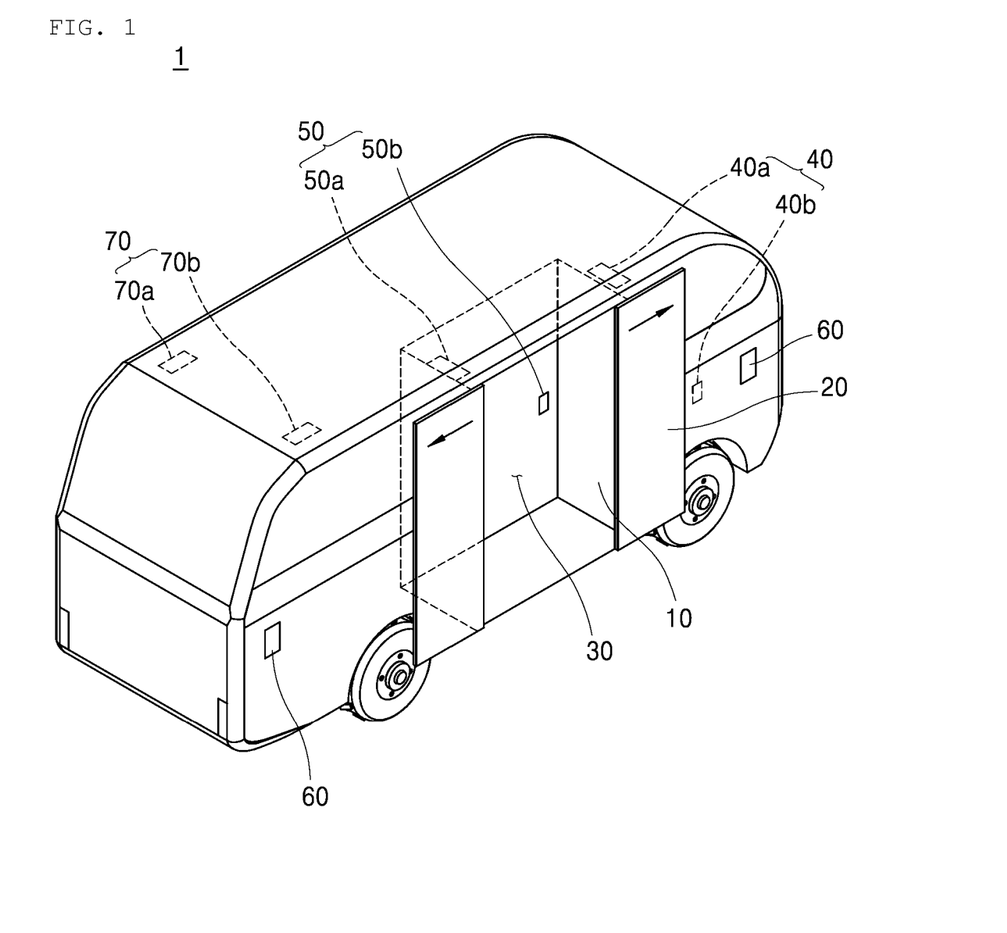
FIG. 1 is an external perspective view of a vehicle according to an embodiment of the present disclosure.

FIG. 1 is an external perspective view of a vehicle 1 according to an embodiment of the present disclosure. FIGS. 2A and 2B are diagrams for describing the structure and operation of the inside door and outside door of the vehicle.

The vehicle according to an embodiment of the present disclosure may include a getting-off zone 30 partitioned by an inside door 10 and an outside door 20.

Referring to FIG. 1, the vehicle 1 according to an embodiment of the present disclosure may include the inside door 10, the outside door 20, a user ID sensor 40, a user authentication sensor 50, a safety sensor 60 and an internal camera 70. The vehicle 1 of FIG. 1 is merely an example for illustrating an embodiment of the present disclosure, and elements thereof are not limited to the embodiment of FIG. 1. Some of the elements may be changed or deleted or some elements may be added, if necessary.

The getting-off zone 30 functioning as the space where a passenger stays in order to get off the vehicle 1 may be formed between the inside door 10 and the outside door 20. In other words, the getting-off zone 30 may be surrounded and partitioned by the inside door 10 and the outside door 20.

To this end, the inside door 10 may be connected to an internal space 1a of the vehicle 1. The outside door 20 may be connected to the outside of the vehicle 1. More specifically, the inside door 10 may be provided between the internal space 1a of the vehicle 1 and the getting-off zone 30. The outside door 20 may be provided between the outside of the vehicle 1 and the getting-off zone 30.

Examples of the inside door 10 and the outside door 20 will be described with reference to FIGS. 2A and 2B as top perspective views of the vehicle 1.

Figure 2A:
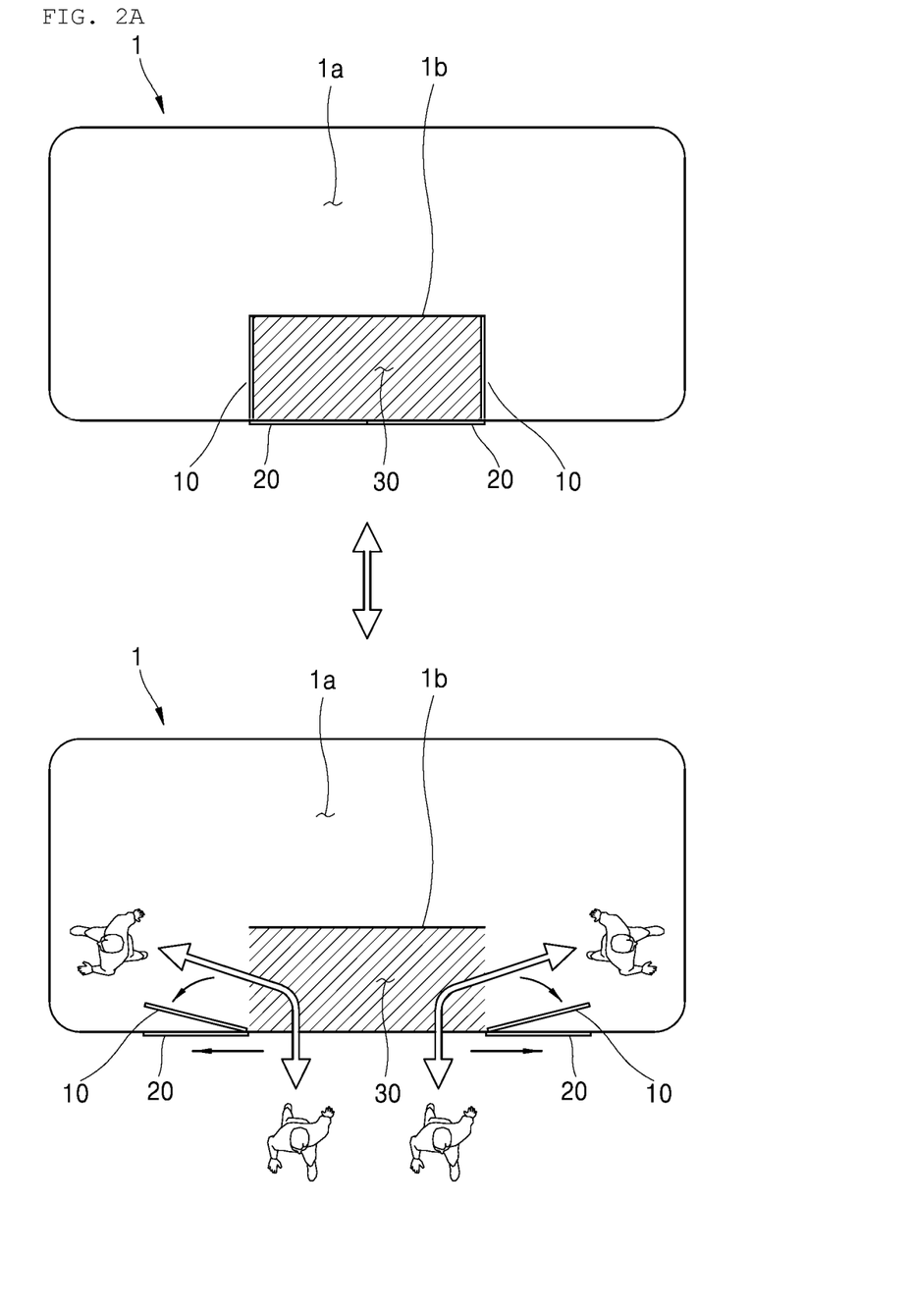
FIGS. 2A and 2B are diagrams for describing the structure and operation of the inside door and outside door of the vehicle.

For example, referring to FIG. 2A, the inside door 10 may be provided in pairs. The pair of inside doors 10 may be hinged to one side of the vehicle 1 and may be open or closed. The outside door 20 may also be provided in pairs. The pair of outside doors 20 may slide along one side of the vehicle 1 to be open or closed.

In this case, the getting-off zone 30 may be surrounded and partitioned by the pair of inside doors 10, the pair of outside doors 20, and a straight-line barrier rib 1b positioned to face the outside doors 20. Accordingly, when all the inside doors 10 and the outside doors 20 are open, all passengers who get off the vehicle 1 and passengers who get on the vehicle 1 can move through the getting-off zone 30.

Figure 2B:
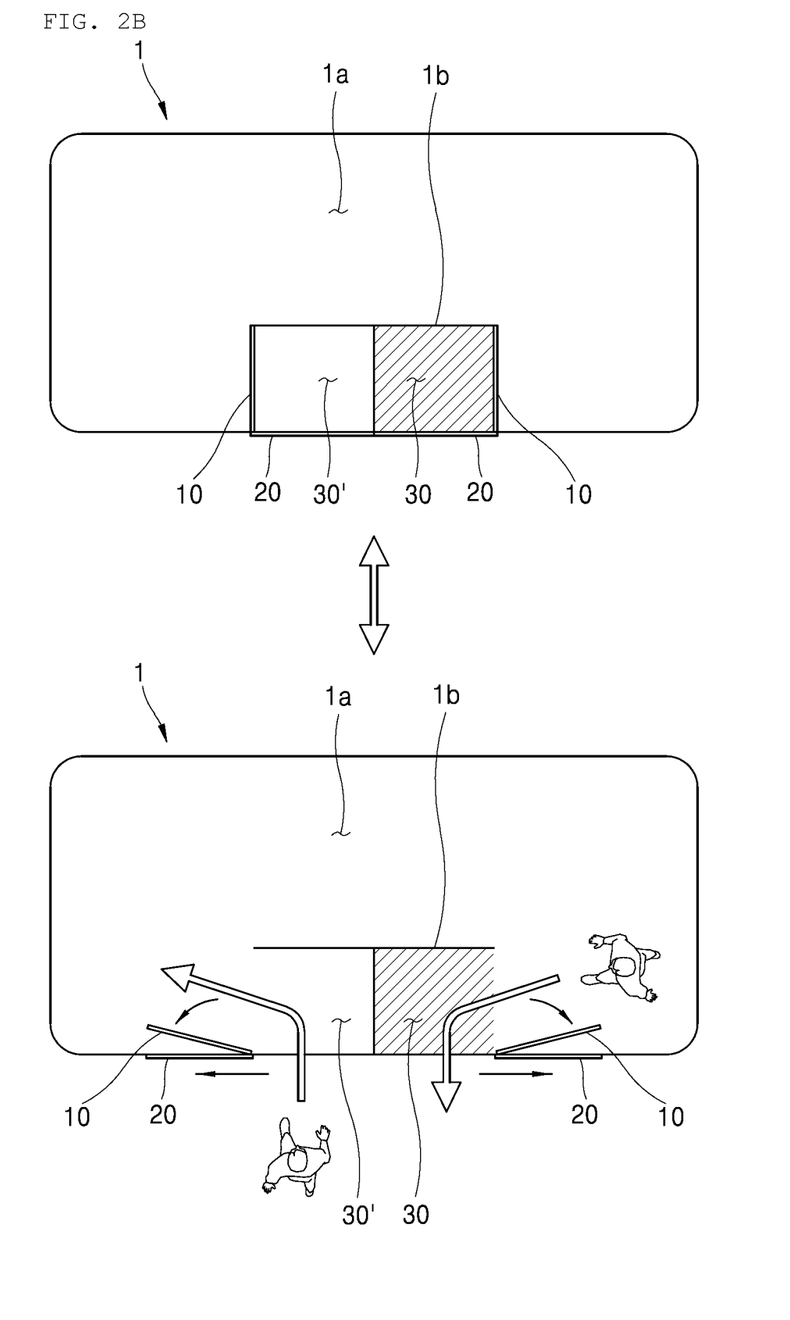

For another example, referring to FIG. 2B, as in the description of FIG. 2A, each of the inside door 10 and the outside door 20 may be provided in pairs. In this case, the getting-off zone 30 may be surrounded and partitioned by any one of the pair of inside doors 10, any one of the pair of outside doors 20, and a T-shaped barrier rib 1b positioned to face the inside doors 10 and the outside doors 20. A getting-on area 30' may be surrounded and partitioned by the other of the pair of inside doors 10, the other of the pair of outside doors 20, and the T-shaped barrier rib 1b.

Accordingly, when all the inside doors 10 and the outside doors 20 are open, a passenger who gets off the vehicle 1 may move through the getting-off zone 30, and a passenger who gets on the vehicle 1 may move through the getting-on area 30'.

The inside doors 10 and the outside doors 20 have been described by taking FIGS. 2A and 2B as examples, but it is to be understood that they are illustrative. In other words, in the present disclosure, the inside door 10 may be implemented as given means for structurally connecting or blocking the internal space 1a of the vehicle 1 and the getting-off zone 30. The outside door 20 may be implemented as given means for structurally connecting or blocking the getting-off zone 30 and the outside of the vehicle 1.

Methods of opening or closing the inside door 10 and the outside door 20 will be described specifically with reference to FIGS. 3 to 9.

Figure 3:
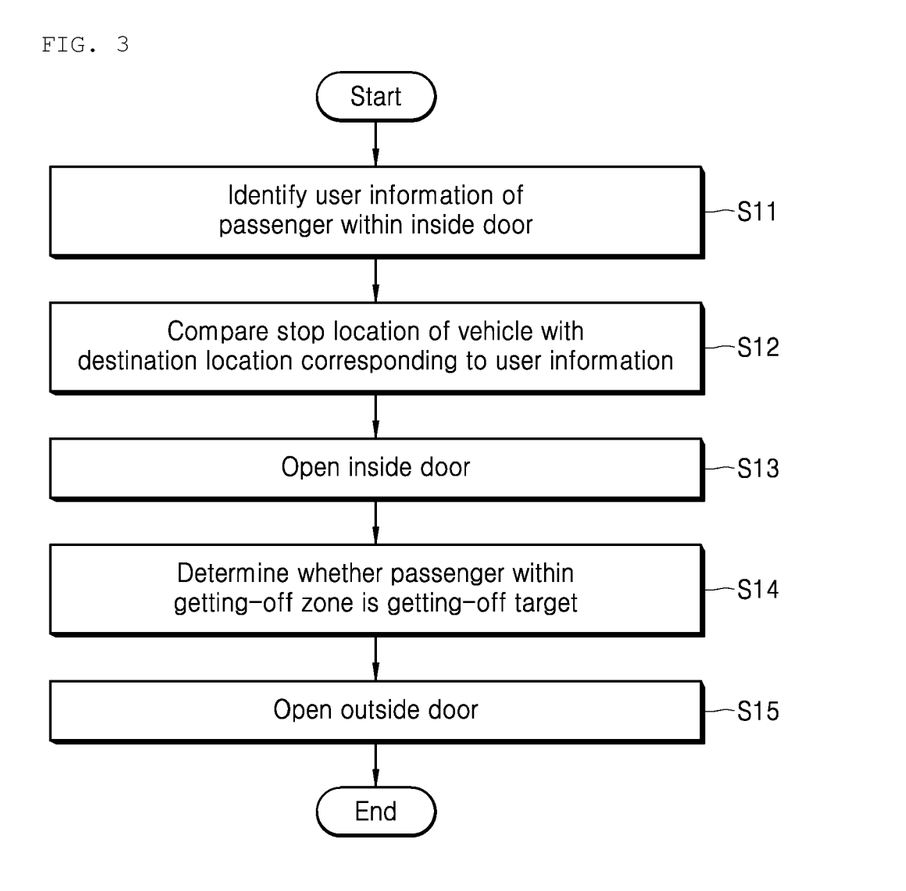
FIG. 3 is a flowchart illustrating a method of opening or closing the door of the vehicle according to an embodiment of the present disclosure.
Figure 4:
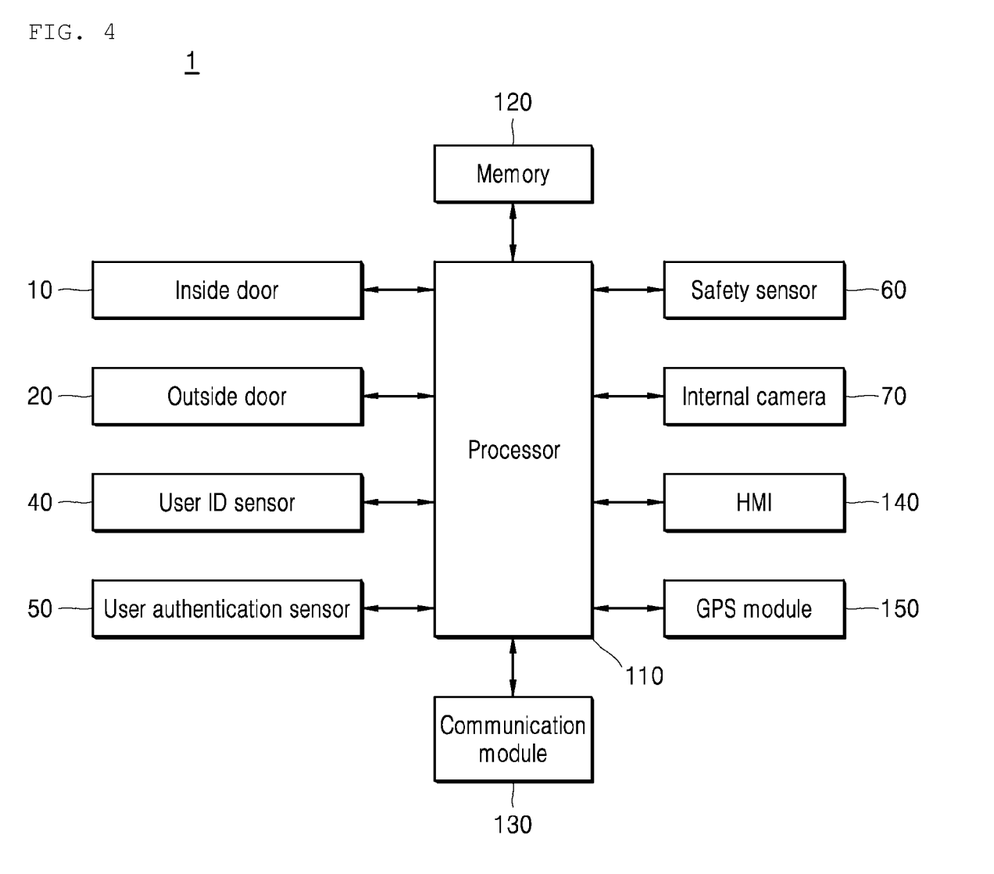
FIG. 4 is an internal block diagram for describing a control flow of the vehicle of FIG. 1.

FIG. 3 is a flowchart illustrating a method of opening or closing the door of the vehicle according to an embodiment of the present disclosure. FIG. 4 is an internal block diagram for describing a control flow of the vehicle of FIG. 1.

Figure 5:
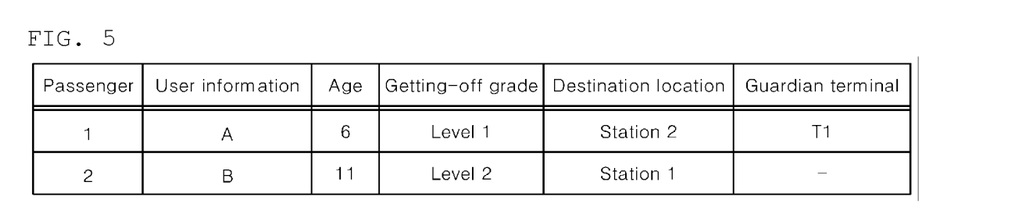
FIG. 5 is a table showing user information, ages, getting-off grades, destination locations and guardian terminals of two passengers.

FIG. 5 is a table showing user information, ages, getting-off grades, destination locations and guardian terminals of two passengers.

Figure 6:
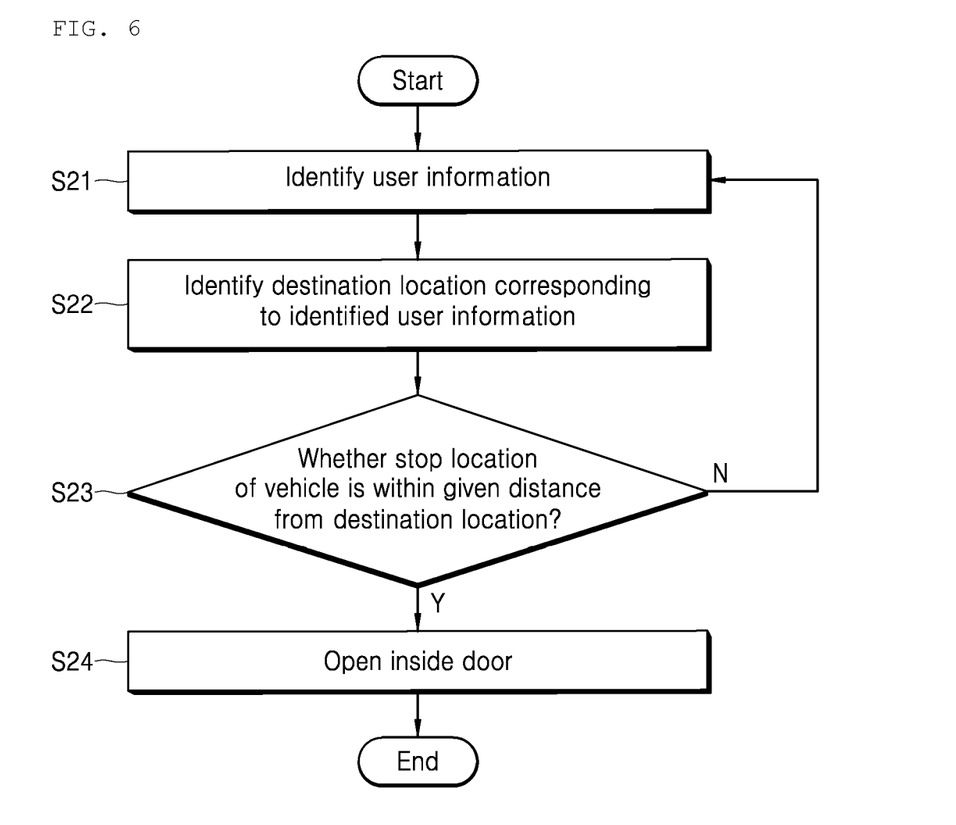
FIG. 6 is a flowchart illustrating a process of opening the inside door based on a result of a comparison between the stop location and destination location of the vehicle.
Figure 7:
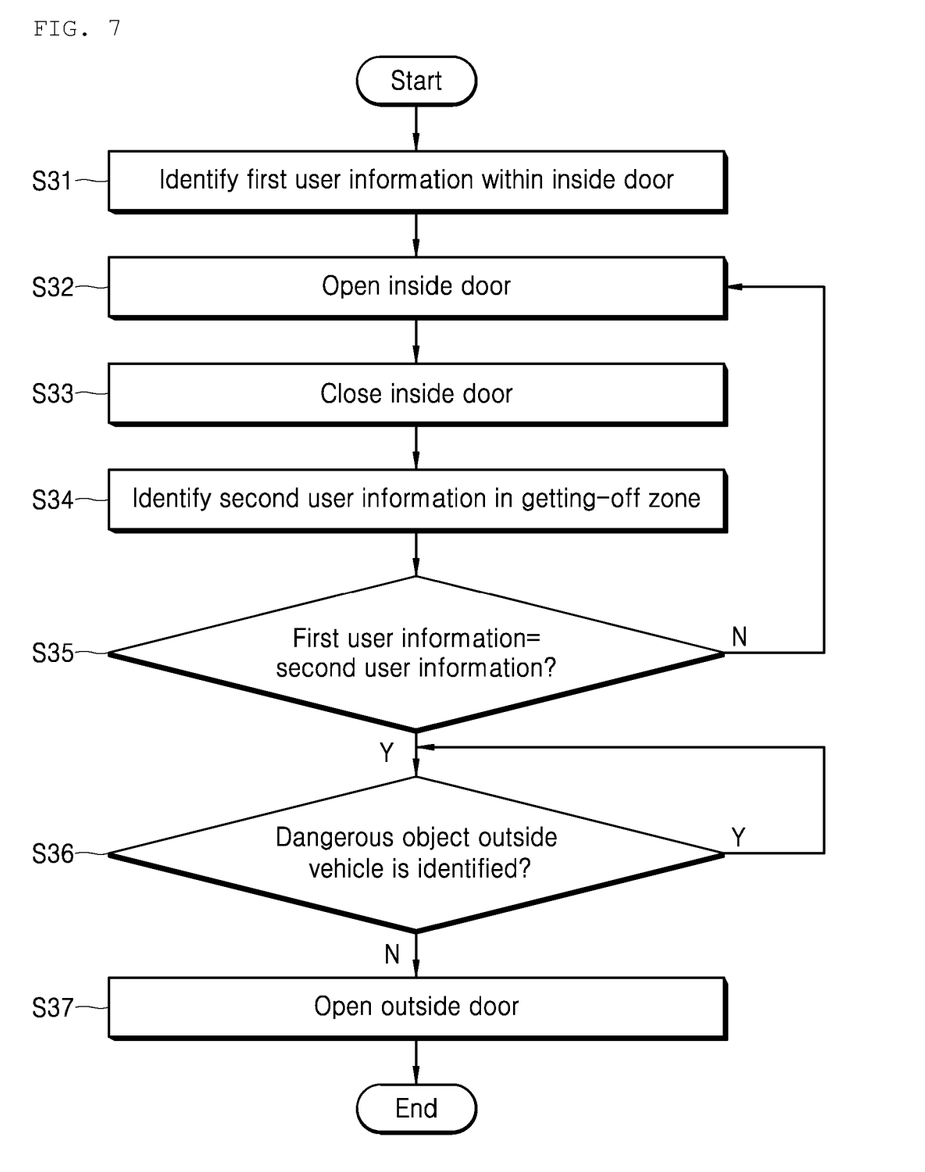
FIG. 7 is a flowchart illustrating a process of opening the outside door depending on whether a passenger in a getting-off zone is a getting-off target.

FIG. 6 is a flowchart illustrating a process of opening the inside door based on a result of a comparison between the stop location and destination location of the vehicle. Furthermore, FIG. 7 is a flowchart illustrating a process of opening the outside door depending on whether a passenger in a getting-off zone is a getting-off target.

Figure 8:
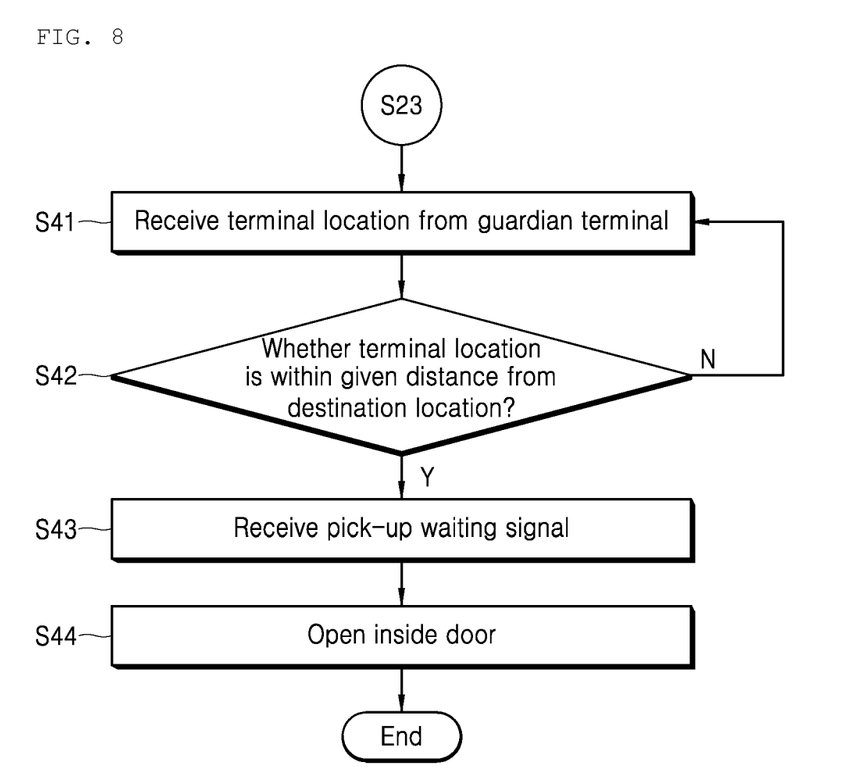
FIG. 8 is a flowchart illustrating a process of opening the inside door through communication with a guardian terminal.
Figure 9:
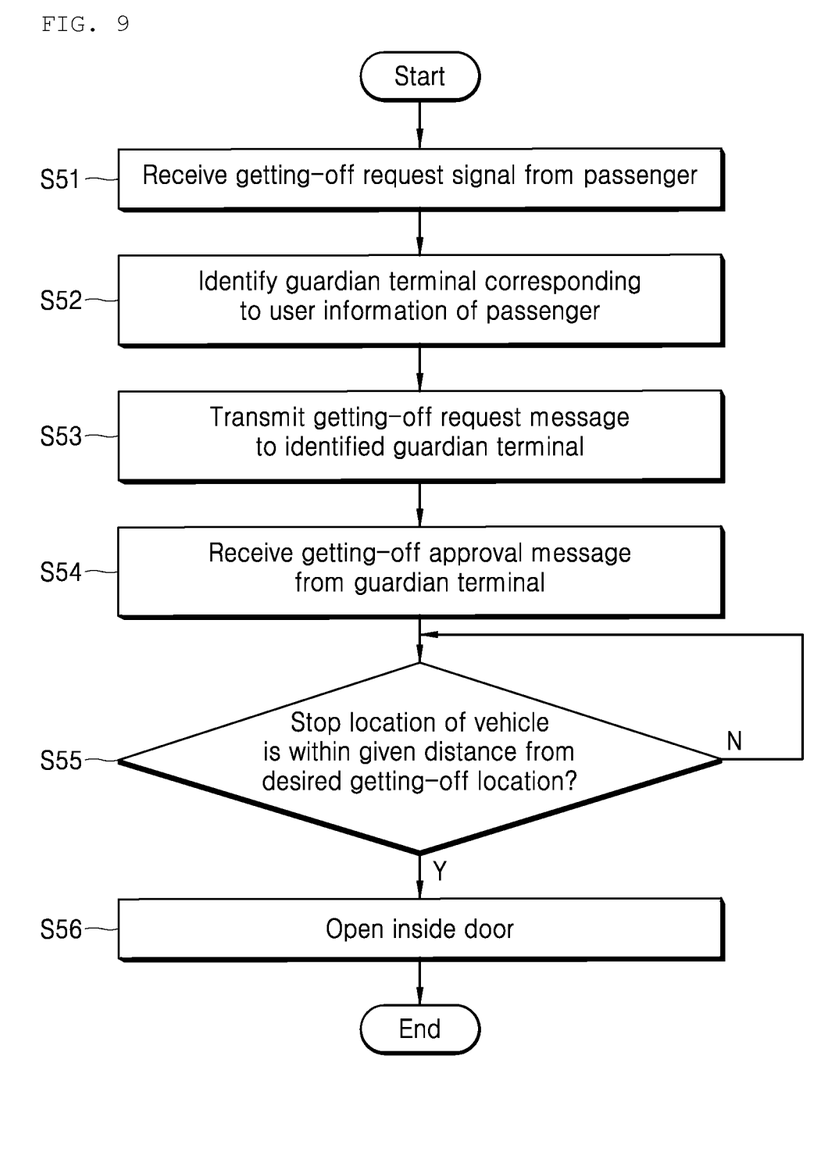
FIG. 9 is a flowchart illustrating a process of opening the inside door if a passenger requests getting-off at a location other than a destination location.

FIG. 8 is a flowchart illustrating a process of opening the inside door through communication with a guardian terminal. Furthermore, FIG. 9 is a flowchart illustrating a process of opening the inside door if a passenger requests getting-off at a location other than a destination location.

Referring to FIG. 3, a method of opening or closing the door of a vehicle according to an embodiment of the present disclosure (hereinafter, referred to as a "door opening or closing method") may include step S10 of identifying user information of a passenger within the inside door 10, step S20 of comparing the stop location of the vehicle 1 with a destination location corresponding to the user information, step S30 of opening the inside door 10 based on a result of the comparison, step S40 of determining whether the passenger within the getting-off zone 30 is a getting-off target, and step S50 of opening the outside door 20 based on a result of the comparison.

The door opening method of FIG. 3 is an embodiment, and steps of the present disclosure are not limited to the embodiment of FIG. 3. Some of the steps may be changed or deleted or some steps may be added, if necessary.

The door opening method of the present disclosure may be performed by the vehicle 1. To this end, the vehicle 1 may further include various elements for opening or closing the door in addition to the elements of FIG. 1.

Referring to FIG. 4, the vehicle 1 according to an embodiment of the present disclosure may further include a processor 110, a memory 120, a communication module 130, a human machine interface (HMI) 140, and a global positioning system (GPS) module 150 in addition to the elements of FIG. 1.

Each of the elements of the vehicle 1 may be implemented as a physical element, including at least one of application specific integrated circuits (ASICs), digital signal processors (DSPs), digital signal processing devices (DSPDs), programmable logic devices (PLDs), field programmable gate arrays (FPGAs), controllers, micro-controllers, and microprocessors.

The operation of each of the elements of the vehicle 1 may be controlled by the processor 110. The processor 110 may process data obtained from each of the elements or data provided to each of the elements. Furthermore, the memory 120 may be configured with a ROM, a RAM, an EPROM, a flash drive or a hard drive, and may store a program for the operation of the processor 110 and various data for an overall operation of the vehicle 1.

The door opening method of FIG. 3 will be described with reference to the elements of FIG. 4. The vehicle 1 may be described as a vehicle 1 that provides an environment in which the vehicle can move a plurality of passengers to a designated location and then the passengers can get off the vehicle. For example, the vehicle 1 may be described as a shuttle bus.

The vehicle 1 may identify user information of a passenger within the inside door 10 (S11). In this case, the user information may include given unique information by which each passenger can be identified.

The passenger in the internal space 1a of the vehicle 1 may move into the inside door 10 in order to get off the vehicle 1. The processor 110 may identify user information of the passenger within the inside door 10 with reference to the memory 120.

More specifically, the processor 110 may identify the user information using a sensor positioned within the internal space 1a of the vehicle 1. Hereinafter, a sensor for identifying a passenger is denoted as the user ID sensor 40, and a sensor for authenticating a passenger is denoted as the user authentication sensor 50.

At least one user ID sensor 40 may be provided within the vehicle 1. The user ID sensor 40 may detect user information of a passenger within the inside door 10. For example, as illustrated in FIG. 1, the user ID sensor 40 may be provided at the top within the inside door 10, and may detect user information. For another example, the user ID sensor 40 may be provided on a surface within the vehicle 1, and may detect user information.

The user ID sensor 40 may be at least one of a face recognition sensor, a fingerprint recognition sensor, an iris recognition sensor, an image recognition sensor, and a near field communication (NFC) sensor. In this case, user information may include facial information, fingerprint information, iris information, image information, or NFC information. User information of each passenger may have been previously stored in the memory 120.

Referring back to FIG. 1, a first user ID sensor 40a provided at the top within the inside door 10 may be a face recognition sensor. A second user ID sensor 40b provided on a surface within the vehicle 1 may be an NFC sensor.

The first user ID sensor 40a may include photographing means. The first user ID sensor 40a may photograph the face of a passenger within the inside door 10 using the photographing means, and may generate facial information. The processor 110 may identify user information of the passenger by comparing the facial information, generated by the first user ID sensor 40a, with facial information of each passenger stored in the memory 120. More specifically, the processor 110 may identify facial information, belonging to a plurality of pieces of user information previously stored in the memory 120 and being identical with the facial information generated by the first user ID sensor 40a, as user information of the passenger.

Each passenger may carry a unique NFC terminal. The second user ID sensor 40b may receive NFC information by performing data communication with the NFC terminal. The processor 110 may identify the passenger by comparing the NFC information, received by the second user ID sensor 40b, with NFC information of each passenger stored in the memory 120. More specifically, the processor 110 may identify NFC information, belonging to a plurality of pieces of NFC information previously stored in the memory 120 and identical with the NFC information received by the second user ID sensor 40b, as user information of the passenger.

It has been assumed that the processor 110 identifies a passenger using the face recognition sensor and the NFC sensor. In addition, the processor 110 may identify user information of a passenger based on information, such as fingerprint information, iris information, or an image such as a barcode or OR code detected by the user ID sensor 40.

The operation of identifying user information may be performed when the vehicle 1 stops.

For the identification of user information, a passenger may have to stand up at a given location within the inside door 10. If a passenger stands up and waits within the vehicle 1 while the vehicle 1 moves, a problem with safety may occur. Accordingly, an operation of identifying user information may be performed only when the vehicle 1 stops.

To this end, for example, the processor 110 may determine whether the vehicle 1 has stopped based on location coordinates of the vehicle 1 obtained by the GPS module 150.

The GPS module 150 may obtain coordinates at which the GPS module 150 is positioned by interpreting satellite signals output by artificial satellites. The GPS module 150 is embedded in the vehicle 1, and thus location coordinates obtained by the GPS module 150 may be location coordinates of the vehicle 1. The processor 110 may determine that the vehicle 1 has stopped if the location of the vehicle 1 obtained by the GPS module 150 is constant for a preset time.

Instead, the vehicle 1 may determine whether the vehicle 1 has stopped using a speedometer provided in the vehicle 1. In other words, the processor 110 may determine that the vehicle 1 has stopped if speed measured by the speedometer of the vehicle 1 is 0.

When the user information of the passenger is identified, the vehicle 1 may compare the stop location of the vehicle 1 with a destination location corresponding to the user information (S12). The stop location of the vehicle 1 may mean the location of the stopped vehicle 1 when the vehicle 1 stops. Furthermore, the destination location is the location of a destination where a passenger is scheduled to get off, and may be previously stored in the memory 120 so that it corresponds to user information.

FIG. 5 is a table illustrating information of two passengers who have gotten on the vehicle 1.

Referring to FIG. 5, a destination location where a passenger 1 is scheduled to get off a vehicle is Station 2, and such information may be previously stored in the memory 120 in accordance with user information A of the passenger 1. Furthermore, a destination location where a passenger 2 is scheduled to get off a vehicle is Station 1, and such information may be previously stored in the memory 120 in accordance with user information B of the passenger 2.

Referring to FIG. 6, the vehicle 1 may identify user information of a passenger within the inside door 10 (S21), and may identify a destination location corresponding to the identified user information (S22).

For example, in FIG. 5, the processor 110 may identify user information of the passenger 2 within the inside door 10 as "B", and may identify a destination location, corresponding to the user information B, as "Station 1" with reference to the memory 120.

Next, the processor 110 may compare Station 1 with the stop location of the vehicle 1. More specifically, the processor 110 may identify the stop location of the vehicle 1 through the GPS module 150, and may determine whether the identified stop location is identical with Station 1 by comparing Station 1 with the identified stop location.

The vehicle 1 may open the inside door 10 based on a result of a comparison between the stop location of the vehicle and the destination location (S13). More specifically, the vehicle 1 may open the inside door 10 if the stop location of the vehicle 1 is the destination location.

In the above example, the processor 110 may compare Station 1 with the stop location. If, as a result of the comparison, Station 1 is not identical with the stop location, the vehicle 1 may not open the inside door 10 because it determines that the vehicle has not yet arrived at Station 1. In contrast, if Station 1 is identical with the stop location, the vehicle 1 may determine that it has arrived at Station 1 and open the inside door 10.

If a degree of congestion in a road is high, the vehicle 1 may not exactly stop at Station 1. In order to take such an inaccurate stop location into consideration, referring to FIG. 6, the vehicle 1 may determine whether the distance between the coordinates of a destination location stored in the memory 120 and the coordinates of the stop location obtained by the GPS module 150 of the vehicle 1 is within a preset distance (S23). The vehicle 1 may open the inside door 10 based on a result of the determination (S24).

In the above example, the processor 110 may identify the coordinates of the stop location through the GPS module 150. For example, the processor 110 may identify the 2-D coordinates (X, Y) of the stop location, and may identify the 3-D coordinates (X, Y, Z) of the stop location.

The coordinates of the destination location, for example, the coordinates of Station 1 may be previously stored in the memory 120. The processor 110 may calculate the distance between the location coordinates of Station 1, stored in the memory 120, and the coordinates of the previously identified stop location. If the calculated distance exceeds a preset distance, for example, 20 m, the processor 110 may determine that the vehicle 1 has not yet arrived at Station 1 and may not open the inside door 10. In contrast, if the calculated distance is within the preset distance, the processor 110 may determine that the vehicle 1 has arrived at Station 1 and may open the inside door 10.

When the inside door 10 is open through the aforementioned process, the passenger may enter a zone between the inside door 10 and the outside door 20, that is, the getting-off zone 30.

The vehicle 1 may determine whether the passenger within the getting-off zone 30 is a getting-off target (S14). In this case, the getting-off target may mean a passenger who is scheduled to get off a vehicle at the stop location of the vehicle 1. More specifically, the getting-off target may mean a passenger identified when the inside door 10 is open. Referring to the above-described example and FIG. 5, when the vehicle 1 stops at Station 1, the passenger 2 may be a getting-off target, and the passenger 1 may not be a getting-off target.

The processor 110 may determine whether the passenger within the getting-off zone 30 is a getting-off target through the user authentication sensor 50 provided in the getting-off zone 30.

At least one user authentication sensor 50 may be provided in the getting-off zone 30. The user authentication sensor 50 may detect user information of a passenger within the getting-off zone 30. For example, as illustrated in FIG. 1, the user authentication sensor 50 may be provided at the top corner of the getting-off zone 30, and may detect user information. The user authentication sensor 50 may be provided in the barrier rib 1b surrounding the getting-off zone 30, and may detect user information.

Like the user ID sensor 40, the user authentication sensor may be at least one of a face recognition sensor, a fingerprint recognition sensor, an iris recognition sensor, an image recognition sensor, and an NFC sensor.

For example, in FIG. 1, a first user authentication sensor 50a provided at the top corner of the getting-off zone 30 may be a face recognition sensor, and a second user authentication sensor 50b provided in the barrier rib 1b may be an NFC sensor.

The first user authentication sensor 50a may include photographing means, may photograph the face of a passenger within the getting-off zone 30 using the photographing means, and may generate facial information. The processor 110 may identify user information of the passenger by comparing the facial information, generated by the first user authentication sensor 50a, with facial information of each passenger stored in the memory 120.

Each passenger may carry a unique NFC terminal. The second user authentication sensor 50b may receive NFC information by performing data communication with the NFC terminal. The processor 110 may identify the passenger by comparing the NFC information, received by the second user authentication sensor 50b, with NFC information of each passenger stored in the memory 120.

The processor 110 may determine whether a passenger within the getting-off zone 30 is a getting-on target based on user information identified by the user authentication sensor 50.

More specifically, the processor 110 may determine a passenger within the getting-off zone 30 as a getting-off target based on the identity of user information identified inside the inside door 10 and user information identified in the getting-off zone 30.

This will be described specifically with reference to FIG. 7. The processor 110 may identify first user information inside the inside door 10 (S31). The operation of identifying user information performed within the inside door 10 may be the same as that described with reference to step S11 of FIG. 4.

The processor 110 may open the inside door 10 based on destination location corresponding to the first user information and the stop location of the vehicle 1 (S32). The processor 110 may determine a passenger detected within inside door 10 as a getting-on target.

When a passenger enters the getting-off zone 30, the processor 110 may close the inside door 10 (S33). More specifically, when the passenger is detected within the getting-off zone 30 by the user authentication sensor 50, the processor 110 may close the inside door 10. Accordingly, the getting-off zone 30 where the passenger is positioned may be surrounded by the closed outside door 20 and the closed inside door 10.

Next, the processor 110 may identify second user information in the getting-off zone 30 (S34), and may determine whether the second user information identified in the getting-off zone 30 is the same as the first user information identified inside the inside door 10 (S35).

In other words, the processor 110 may compare the first user information with the second user information in order to determine whether the passenger detected inside the inside door 10 is identical with the passenger detected in the getting-off zone 30.

If the passenger detected inside the inside door 10 does not enter the getting-off zone 30 or a wrong passenger other than the passenger detected inside the inside door 10 enters the getting-off zone 30, the first user information and the second user information may be different. If the first user information and the second user information are different, the processor 110 may determine that the passenger within the getting-off zone 30 is not a getting-off target, and may open the inside door 10 so that the corresponding passenger may move again into the vehicle 1 (S32).

In contrast, if the first user information and the second user information are the same, the processor 110 may determine that the passenger within the getting-off zone 30 is a getting-off target, and may open the outside door 20 (S37).

The operation of comparing the first user information with the second user information may be performed on each passenger. For example, if a passenger scheduled to get off a vehicle at a specific stop location is plural, the comparison operation of step S35 may be performed on each passenger. The processor 110 may open the outside door 20 only if all of the plurality of passengers is determined to be getting-off targets.

Through the above process, a passenger within the vehicle 1 can get off the vehicle 1 only at a preset destination.

As described above, the present disclosure allows only a passenger who needs to get off a vehicle at a specific destination to selectively get off the vehicle. Accordingly, a problem in that a passenger does not get off a shuttle bus at a desired destination and is left alone in the shuttle bus or wastes time in the shuttle bus can be prevented. Furthermore, a missing accident which may occur because a passenger gets off a vehicle at a wrong destination or the waste of time and money consumed for an additional movement to the original destination can be prevented.

If the passenger within the getting-off zone 30 is a getting-off target, the vehicle 1 may open the outside door 20 based on whether a dangerous object outside the vehicle 1 is identified.

Referring back to FIG. 7, the processor 110 may determine whether the passenger is a getting-off target at step S35. Next, the processor 110 may continue to determine whether a dangerous object outside the vehicle 1 is identified (S36), and may open the outside door 20 only if a dangerous object is not identified (S37).

The dangerous object is an obstacle detected outside the vehicle 1, and may mean an object having a possibility that a passenger who gets off the vehicle 1 may collide against the object. In order to identify the dangerous object, the vehicle 1 may detect an obstacle outside the vehicle 1, and may determine whether the detected obstacle is a dangerous object based on the moving direction and moving speed of the detected obstacle.

Referring back to FIG. 1, at least one safety sensor 60 may be provided on the outside surface of the vehicle 1. The safety sensor 60 is a given sensor for identifying an obstacle outside the vehicle 1, and may be implemented as a camera sensor, an infrared sensor, an ultrasonic sensor, light detection and ranging (lidar), or radio detection and ranging (radar), for example.

The processor 110 may detect an obstacle outside the vehicle 1 using the safety sensor 60, may identify the moving direction of the identified obstacle, and may calculate the moving speed of the identified obstacle. The processor 110 may identify, as a dangerous object, an obstacle that belongs to a plurality of obstacles detected outside the vehicle 1, has a moving direction toward the vehicle 1, and has a preset moving speed or more.

The processor 110 may not open the outside door 20 if a dangerous object is identified, and may open the outside door 20 only if a dangerous object is not identified.

As described above, the present disclosure can prevent a collision accident attributable to a different vehicle when a passenger gets off the vehicle 1 because the passenger is allowed to get off the vehicle 1 based on whether a dangerous object outside the vehicle 1 is identified.

The operation of opening the inside door 10 may be performed if there is a guardian's approval.

More specifically, if user information of a passenger is identified inside the inside door 10, the vehicle 1 may receive a pick-up waiting signal from a guardian terminal corresponding to the user information. Next, the vehicle 1 may open the inside door 10 only if the pick-up waiting signal is received from the guardian terminal. In this case, the pick-up waiting signal may be a given signal indicating that the guardian now waits to pick up the passenger at the destination location of the passenger.

Whether a guardian's approval is necessary may be performed based on a getting-off grade of a passenger. Referring back to FIG. 5, the getting-off grade of the passenger 1 may be Level 1, and the getting-off grade of the passenger 2 may be Level 2. The getting-off grade of a passenger may be determined based on the age of the passenger. For example, the getting-off grade of a passenger under 7 years old may be determined as Level 1, and the getting-off grade of a passenger above 7 years old may be determined as Level 2. In contrast, the getting-off grade of a passenger may be determined based on a guardian's request.

In this case, a guardian's approval operation may be performed on only a passenger having Level 1. That is, in the present disclosure, assuming that the vehicle 1 is a shuttle bus, a passenger under 7 years old may need to be picked up by a guardian. The vehicle 1 may identify the getting-off grade of a passenger with reference to the memory 120, and may open the inside door 10 based on a guardian's approval if the identified getting-off grade is Level 1.

The guardian may transmit the pick-up waiting signal to the vehicle 1 using the guardian terminal at the destination location of the passenger. The transmission of the pick-up waiting signal may be performed by an application installed in the guardian terminal.

When the pick-up waiting signal is received, the processor 110 may perform the operation of opening the inside door 10 and the operation of opening the outside door 20. Accordingly, the passenger may get off the vehicle at the destination location where the guardian waits. The guardian may pick up the passenger.

The vehicle 1 may identify that the guardian waits at the destination location of the passenger.

To this end, the vehicle 1 may receive a terminal location from the guardian terminal, and may receive the pick-up waiting signal when the distance between the received terminal location and the destination location is within a preset distance. That is, the vehicle 1 may receive the pick-up waiting signal only if the guardian terminal is positioned near the destination.

Referring back to FIG. 5, the processor 110 may detect the passenger 1 inside the inside door 10. Next, the processor 110 may determine that a guardian's approval is necessary for the getting-off of the passenger 1 based on the getting-off grade "Level 1" of the passenger 1, and may identify the guardian terminal of the passenger 1 as T1.

A subsequent process will be described with reference to FIG. 8. While the vehicle 1 moves to Station 2 or when the vehicle 1 stops at Station 2, the processor 110 may continue to receive a terminal location from the guardian terminal T1 through the communication module 130 (S41). In this case, the terminal location may be obtained through the GPS module of the guardian terminal T1. The guardian terminal T1 may transmit the terminal location to the vehicle 1 through an application.

The processor 110 may determine whether the received terminal location is within a given distance, for example, 20 m from Station 2, that is, the destination location of the passenger 1 (S42). If the terminal location is within the given distance from Station 2, the processor 110 may receive a pick-up waiting signal from the guardian terminal T1 (S43).

When the pick-up waiting signal is received, the processor 110 may open the inside door 10 (S44). Accordingly, the passenger 1 may enter the getting-off zone 30. Next, if the passenger positioned in the getting-off zone 30 is the passenger 1, that is, if the passenger positioned in the getting-off zone is a getting-off target, the processor 110 may open the outside door 20.

Through such a process, the vehicle 1 may allow the passenger to get off the vehicle 1 only if the guardian waits to pick up the passenger at the destination location.

As described above, the present disclosure may allow a passenger to get off a vehicle only if a guardian is positioned at the destination of the passenger. Accordingly, if a passenger is a child passenger to be protected, the passenger can get off the vehicle 1 safely under the observation of a guardian.

A passenger within the vehicle 1 may request to get off the vehicle at a different place other than a preset destination location. In this case, the vehicle 1 may allow the passenger to get off the vehicle on the premise of a guardian's approval.

Referring to FIG. 9, the vehicle 1 may receive a getting-off request signal, including a desired getting-off location, from a passenger (S51). When the getting-off request signal is received, the vehicle 1 may identify a guardian terminal corresponding to user information of the passenger (S52), and may transmit a getting-off request message, including the desired getting-off location, to the identified guardian terminal (S53).

Next, the vehicle 1 may receive a getting-off approval message from the guardian terminal (S54), and may continue to compare the stop location of the vehicle 1 with the desired getting-off location (S55). If the stop location of the vehicle 1 is within a given distance from the desired getting-off location, the vehicle 1 may open the inside door 10 (S56).

The passenger illustrated in FIG. 5 will be described as an example. The processor 110 may receive a getting-off request signal, including a desired getting-off location "Station 1" different from a preset destination location "Station 2", from the passenger 1. The getting-off request signal may be received from the terminal of the passenger 1 or may be received through the HMI 140 of the vehicle 1.

The HMI 140 may perform a function for basically outputting information and the state of the vehicle 1 to a driver visually and acoustically through a plurality of physical interfaces. The HMI 140 may be provided for each passenger. For example, the HMI 140 may be provided in each seat. A passenger in each seat may be previously determined. In other words, the passenger 1 may sit in a seat equipped with a specific HMI 140, and may input a getting-off request signal through the specific HMI 140. The processor 110 may receive the getting-off request signal through the specific HMI 140.

When the getting-off request signal is received, the processor 110 may identify a guardian terminal, corresponding to the user information A of the passenger 1, as T1 with reference to the memory 120. Next, the processor 110 may transmit a getting-off request message including Station 1, that is, a desired getting-off location, to the guardian terminal T1 through the communication module 130.

A corresponding guardian may receive the getting-off request message through the guardian terminal T1, and may transmit a getting-off approval message to the vehicle 1 so that the passenger 1 can get off the vehicle at Station 1. After receiving the getting-off approval message through the communication module 130, the processor 110 may continue to compare the stop location of the vehicle 1 with Station 1. If a getting-off location is within a given distance from Station 1, the processor 110 may open the inside door 10.

Accordingly, the passenger 1 may enter the getting-off zone 30. If the above-described condition in which the outside door 20 is open is satisfied, the passenger 1 may get off the vehicle at Station 1. Even in this case, the processor 110 may determine whether the guardian waits at Station 1 in order to pick up the passenger 1 through the steps of FIG. 8, and may open the inside door 10 only if the guardian waits to pick up the passenger 1.

As described above, the present disclosure allows a passenger to get off a vehicle at an exceptionally designated destination other than a designated destination if there is a guardian's approval. Accordingly, the present disclosure can basically prevent the passenger from getting off the vehicle at a wrong destination, and can allow a guardian to be aware of the getting-off location of the passenger if the passenger gets off the vehicle at the exceptionally designated destination.

The vehicle 1 may detect a danger through a sensor within the vehicle 1, and may open both the inside door 10 and the outside door 20 when a danger is detected.

Referring back to FIG. 1, in order to detect a danger occurring in the vehicle 1, the vehicle 1 may be equipped with the internal camera 70. For example, the vehicle 1 may be equipped with a visible image camera for detecting a danger occurring in the vehicle through a visible image of the danger, and may be equipped with an infrared camera for detecting a danger occurring in the vehicle 1 through a thermal image.

The processor 110 may detect a danger by analyzing an image captured by the internal camera 70. For example, the processor 110 may identify each passenger by extracting an object from a visible image captured by the visible image camera, and may detect a danger if a nonauthorized passenger is identified among identified passengers.

Furthermore, the processor 110 may identify a temperature within the vehicle 1 based on a thermal image captured by the infrared camera, and may detect a danger if the identified temperature is higher than a preset highest temperature or less than a set lowest temperature.

If such a danger is detected, the processor 110 may open both the inside door 10 and the outside door 20. A passenger within the vehicle 1 can freely get off the vehicle 1.

As described above, the present disclosure can allow all passengers to get off the vehicle 1 regardless of a stop location if a danger is detected in the vehicle 1. Accordingly, the present disclosure can allow all passengers to escape from the vehicle 1 when an emergency condition occurs.

Furthermore, when a danger is detected, the processor 110 may identify a guardian terminal corresponding to user information of each of passengers disposed within the vehicle 1, and may transmit a danger guide message to each of the identified guardian terminals.

The danger guide message may be a given message indicating that a danger is detected in the vehicle 1. For example, the danger guide message may include information notifying that a nonauthorized outsider has got on the vehicle, and may include information notifying a fire.

The operation of detecting a passenger, the operation of identifying a guardian terminal corresponding to a passenger, and the data communication with a guardian terminal have been described above, and thus detailed descriptions thereof are omitted.

The present disclosure allows only a passenger who needs to get off a vehicle at a specific destination to selectively get off the vehicle. Accordingly, the present disclosure can prevent a problem in that a passenger does not get off a shuttle bus at a desired destination and is left alone in the shuttle bus or wastes time in the shuttle bus. Furthermore, the present disclosure can prevent a missing accident which may occur because a passenger gets off at a wrong destination or the waste of time and money consumed for an additional movement to the original destination.

Furthermore, the present disclosure allows a passenger to get off a vehicle only if a guardian is positioned at the destination of the passenger. Accordingly, a child passenger to be protected can safely get off a vehicle under the observation of a guardian.

Furthermore, the present disclosure can prevent a collision accident attributable to a different vehicle when a passenger gets off a vehicle by allowing the passenger to get off the vehicle based on whether a dangerous object outside the vehicle is identified.

Furthermore, the present disclosure allows a passenger to get off a vehicle at an exceptionally designated destination other than a destination if there is a guardian's approval. Accordingly, the present disclosure can basically prevent the passenger from getting off the vehicle at a wrong destination, and can allow a guardian to be aware of the getting-off location of the passenger if the passenger gets off the vehicle at the exceptionally designated destination.

Furthermore, the present disclosure allows all passengers to get off a vehicle regardless of a stop location if a danger is detected in the vehicle. Accordingly, the present disclosure can allow all the passengers to escape from the vehicle when an emergency condition occurs.

Other detailed effects of the present disclosure along with the above-described effects have been described while detailed contents for practicing the present disclosure are described.

The present disclosure described above may be substituted, modified and changed in various ways by a person having ordinary skill in the art to which the present disclosure pertains without departing from the technical spirit of the present disclosure, and thus is not restricted by the above-described embodiments and the accompanying drawings.

What is claimed is:

1. A method of opening or closing a door of a vehicle comprising a getting-off zone partitioned by an inside door and an outside door, the method comprising:
   identifying user information of a passenger within the inside door;
   opening the inside door based on a result of a comparison between a stop location of the vehicle and a destination location corresponding to the user information;
   determining whether a passenger within the getting-off zone is a getting-off target; and
   opening the outside door based on a result of the determination.

2. The method of claim 1, wherein:
   the inside door is provided between an internal space of the vehicle and the getting-off zone, and
   the outside door is provided between an outside of the vehicle and the getting-off zone.

3. The method of claim 1, wherein the identifying of the user information comprises identifying the user information when the vehicle stops.

4. The method of claim 1, wherein the identifying of the user information comprises identifying the user information using a sensor positioned in an internal space of the vehicle.

5. The method of claim 4, wherein the sensor comprises at least one of a face recognition sensor, a fingerprint recognition sensor, an iris recognition sensor, an image recognition sensor, and a near field communication (NFC) sensor.

6. The method of claim 1, wherein the opening of the inside door based on the result of the comparison between the stop location of the vehicle and the destination location corresponding to the user information comprises:
   identifying the destination location corresponding to the user information with reference to a memory; and opening the inside door if the stop location of the vehicle is the destination location.

7. The method of claim 1, wherein the opening of the inside door based on the result of the comparison between the stop location of the vehicle and the destination location corresponding to the user information comprises:
identifying the destination location corresponding to the user information with reference to a memory; and
opening the inside door if a distance between coordinates of the destination location stored in the memory and coordinates of the stop location obtained by a GPS module within the vehicle is within a preset distance.

8. The method of claim 1, wherein the determining of whether the passenger within the getting-off zone is the getting-off target comprises:
identifying the user information of the passenger using a sensor positioned in the getting-off zone; and
determining the passenger within the getting-off zone to be the getting-off target based on an identity of the user information identified inside the inside door and the user information identified in the getting-off zone.

9. The method of claim 1, further comprising:
closing the inside door when the passenger enters the getting-off zone; and
opening the closed inside door if it is determined that the passenger within the getting-off zone is not a getting-off target.

10. The method of claim 1, wherein the opening of the outside door comprises opening the outside door based on whether a dangerous object outside the vehicle is identified.

11. The method of claim 10, further comprising:
detecting an obstacle outside the vehicle; and
identifying the obstacle as a dangerous object based on a moving direction and moving speed of the detected obstacle.

12. The method of claim 1, further comprising receiving a pick-up waiting signal from a guardian terminal corresponding to the user information if the user information is identified,
Wherein the opening of the inside door comprises opening the inside door when the pick-up waiting signal is received.

13. The method of claim 12, wherein the receiving of the pick-up waiting signal from the guardian terminal corresponding to the user information if the user information is identified comprises:
receiving a terminal location from the guardian terminal; and
receiving the pick-up waiting signal if a distance between the received terminal location and the destination location is within a preset distance.

14. The method of claim 1, further comprising:
receiving a getting-off request signal, comprising a desired getting-off location, from the passenger;
identifying a guardian terminal corresponding to the user information of the passenger; and
transmitting a getting-off request message, comprising the desired getting-off location, to the guardian terminal and receiving a getting-off approval message from the guardian terminal; and
opening the inside door based on a result of a comparison between the stop location of the vehicle and the desired getting-off location.

15. The method of claim 1, further comprising:
detecting a danger using a sensor within the vehicle; and
opening the inside door and the outside door when the danger is detected.

16. The method of claim 15, further comprising:
identifying a guardian terminal corresponding to user information of each of all passengers within the vehicle when the danger is detected; and
transmitting a danger guide message to each of the identified guardian terminals.

* * * * *